Nov. 5, 1968    E. AGALIDES ET AL    3,409,787
PIEZOELECTRIC TRANSDUCER SYSTEM
Filed Nov. 15, 1966    3 Sheets-Sheet 1

INVENTORS
EUGENE AGALIDES
LESLIE C. STEWART
BY Harry A. Herbert Jr.
ATTORNEY

Eugene J. Pawlikowski
AGENT

EXCITING WAVEFORM

A

OUTPUT ON PHOTOCELL     DAMPING

NO DAMPING

B

C

UNDERDAMPED

D

E

CRITICALLY DAMPED

F

G

OVER DAMPED

H

INVENTORS
EUGENE AGALIDES
LESLIE C. STEWART
BY *Harry A. Herbert Jr*
ATTORNEY

*Eugene J. Pawlikowski*
AGENT

United States Patent Office 3,409,787
Patented Nov. 5, 1968

3,409,787
PIEZOELECTRIC TRANSDUCER SYSTEM
Eugene Agalides and Leslie C. Stewart, Rochester, N.Y., assignors, by mesne assignments, to the United States of America as represented by the Secretary of the Air Force
Filed Nov. 15, 1966, Ser. No. 594,588
4 Claims. (Cl. 310—8.2)

This invention relates to piezoelectric transducers and, particularly, to a transducer system substantially free of the ringing so characteristic of undamped piezoelectric elements.

An object of the present invention is to provide a piezoelectric transducer system in which unwanted oscillations are virtually completely damped.

Another object of the present invention is the provision of a transducer system in which the frequency response of piezoelectric elements is improved considerably over prior art systems.

A further object of the invention is to provide a system for electrically driving a piezoelectric element so as to produce deflection for a given input signal with little distortion of the mechanically equivalent output signal.

The foregoing objects, when applied to a transducer system embodying an electrically driven piezoelectric element are carried into effect by inserting a zero filter network between the input signal-producing generator and the amplifier which applies the driving power to the piezoelectric element. By selecting proper values for the components of the filter network, substantially zero ringing of either the upper or the lower part of the output waveform can be obtained while simultaneously strongly reducing oscillation of the opposite part of the waveform.

Other objects and features of the invention will become apparent from the following detailed description of a specific embodiment of the invention when read in conjunction with the appended drawings in which.

Figure 6:
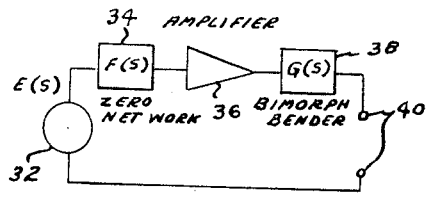
FIG. 6 is a schematic diagram of a specific embodiment of the invention.
Figure 8:
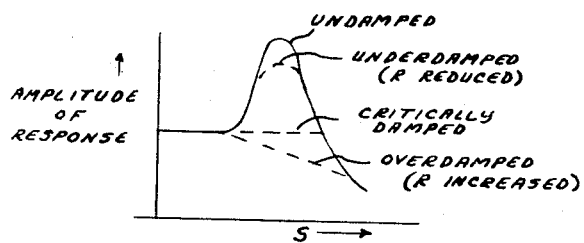
Figure 9:
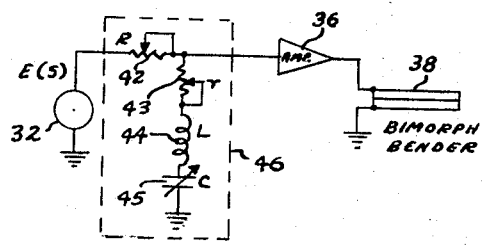
Figure 10:
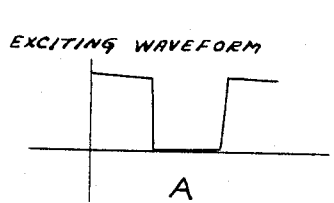
Figure 10:
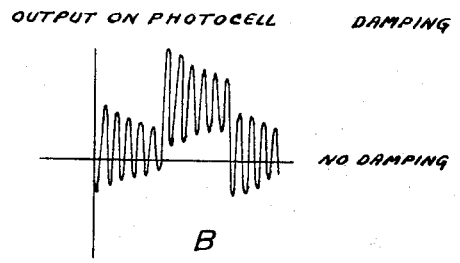
Figure 10:
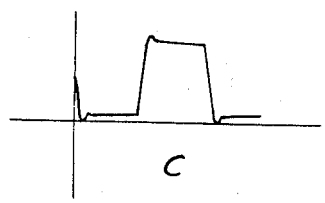
Figure 10:
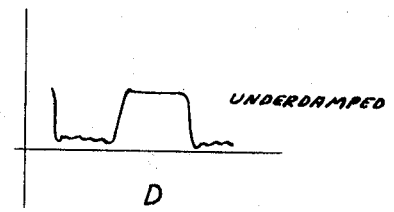
Figure 10:
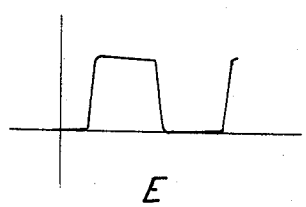
Figure 10:
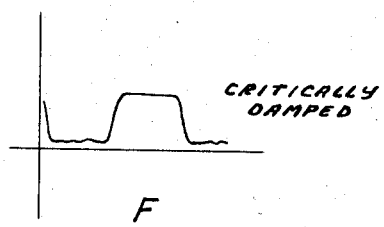
Figure 10:
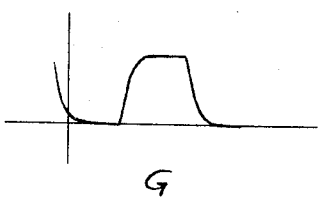
Figure 10:
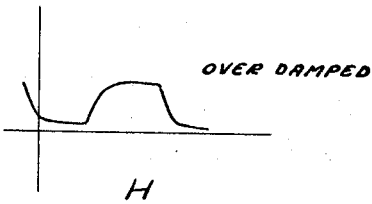

FIG. 8 demonstrates different degrees of damping of a bimorph bender;

FIG. 9 is essentially the schematic diagram of FIG. 6 but showing the zero network in greater detail; and FIG. 10 shows several responses of a bimorph bender with varying degrees of damping by the zero network.

Piezoelectricity is the so-called "pressure electricity" and is well known in the art as a property of certain crystals, such as quartz, Rochelle salt, tourmaline, barium titanate, and many others. A ceramic is composed of a multitude of crystals in random orientation and its properties are the sum of the properties of all these crystallites. If the ceramic is made of ferroelectric crystals, it will display a dielectric hysteresis loop just like the one in a Rochelle salt display. Not every domain in the ceramic aligns its dipoles parallel to the field, but enough of them do so to give an overall effect. For some ceramics, the piezoelectricity is quite strong, but it would not equal the effect in a single-domain crystal of the same composition.

The best measure of strength of the piezoelectric effect is the electromechanical coupling coefficient $k$. It measures the ability of the crystal or ceramic to change energy from one form to another—i.e., to act as a transducer of energy. This is not an efficiency since efficiency is concerned with output and input of power, regardless of form, and depends only on the losses. By charging a slab of crystal of ceramic provided with electrodes with electrical energy, part of the input energy will be transduced to mechanical energy according to the following relationship:

$$k^2 = \frac{\text{elec. energy converted to mech. energy}}{\text{input electrical energy}}$$

The elasticity of the slab, measured by the stress divided by the strain or Young's modulus, is different when the electrodes are open than when they are shorted. This difference is elasticity for the two states, i.e., electrodes open or electrodes shorted, can be expressed by:

$$Y_{\text{open circuit}}(1-k^2) = Y_{\text{short circuit}}$$

Instead of the $k^2$ term, $k$ is actually used; both terms are dimensionless numbers. Typical values of $k$ are: 0.1, or 10 percent, for quartz and tourmaline; 0.5, or 50 percent, for ceramic $BaTiO_3$; or 70 percent, for Clevite PZT ceramic; and as high as 0.9, or 90 percent, for Rochelle salt, providing it is kept at its most favorable temperature.

The electromechanical coupling coefficient $k$ is measured on geometrically shaped crystal or ceramic samples at their natural mechanical resonance. At resonance, characteristic changes in electrical impedance can be noted. By determining these characteristic frequencies, the coupling coefficient and elastic moduli can be evaluated. For ceramic samples, thin disks vibrating radially are frequently used to find the planar coupling coefficient $k_p$. Typical values for $k_p$ are: 0.35 for $BaTiO_3$, or barium titanate, a polycrystalline ceramic substance, and 0.50 to 0.55 for Clevite PZT ceramics. Specially prepared PZT compositions have shown planar coupling of nearly 0.7, a remarkably high value.

Figure 1:
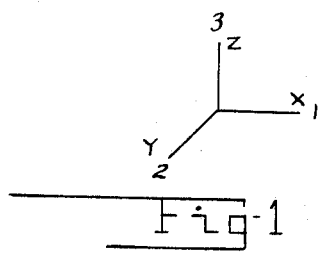
FIG. 1 represents the orthogonal axes of a crystal.

The constants which describe piezoelectric elements are generally written as tensor components with subscripts, such as $d_{33}$ or $d_{15}$. Consider a crystal with orthogonal axes X, Y, and Z, represented as 1, 2, and 3 in FIG. 1. The first subscript is the electrical direction, the second the mechanical direction. The numbers 4, 5, and 6 refer to shear around X, Y, and Z, respectively. Thus, $d_{31}$ measures the deflection along X in response to a voltage applied in the Z direction. The quantity $d_{15}$ measures the shear deflection around the Y axis caused by a voltage along the X axis. Similarly, $d_{33}$ measures the electrical effect in the Z direction of a stress in the same direction, or the charge in this direction that results from a parallel force.

The $d$ coefficient measures the amount of charge caused by a given force, or the deflection caused by a given voltage. Customary units are micro-microcoulombs per newton. The $d$ constant is numerically the same in the direct as in the converse effect. Typical values for $d_{11}$ are: $2\times10^{-12}$ coulomb per newton (coul./N.) for quartz; 2 coul./N. for tourmaline; 150 coul./N. for Rochelle salt; 180 coul./N. for barium titanate; and between 300 and 600 coul./N. for PZT ceramic. The range of values $d_{11}$ for PZT ceramic represents a maximum of six angstroms per volt.

The field produced by a given stress is denoted by the constant $g$ and is given by $$g = \frac{\text{volts/meter}}{\text{newtons/square meter}}$$

and is usually simplified to $10^{-3}$ meter volt/newton (meter v./N.). Typical values of $g_{33}$ are: $12\times10^{-3}$ meter v./N. for barium titanate: 12 to 35 meter v./N. for different kinds of PZT; 90 meter v./N. for Rochelle salt; and 50 meter v./N. for the $g_{11}$ of quartz.

The constants $g$ and $d$ are interrelated by their dielectric constants and conform to $$g=\frac{d}{K\epsilon_0} \text{ or } gK\epsilon_0=d \qquad (1)$$

where $K$ is the dielectric constant and $\epsilon_0$ the permittivity of space, $9\times10^{-12}$ farads per meter. Essentially, $g$ and $d$ should both be high. Inasmuch as the coupling coefficient is essentially the product of $g$ and $d$, multiplied by the elastic modulus, we see that $$k^2=gdY$$

thus the value of high coupling coefficient for both types of application becomes evident.

For greater displacement of a crystal due to the application of an electric field, the "Bimorph" combination, which is two ceramic plates operating in the compression-expansion mode, may be used. In this sandwich-type piezoelectric element, two plates are bonded together in such a manner that one plate tends to expand while the second plate tends to contract upon application of voltage. This unit, when mounted such as to prevent movement of one end thereof, deflects mechanically at the other end and permits a much larger tip deflection for a given load then a solid element. For bimorphs, however, the resonant frequency is quite low and so, for operation at high frequencies, bimorphs are generally not recommended without compensating forms of mounting to correct for their high compliance.

Figure 2:
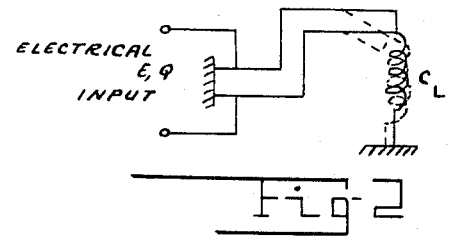
FIG. 2 is the ideal case of mounting a compliant element.

Referring to FIG. 2, for the case of an ideally mounted mechanically loaded element with a compliant load $C_L$, the following equations apply:

$$d=NC_1E\frac{C_L}{N^2C_1+C_m+C_L}\simeq NC_1E\frac{C_L}{C_m+C_L} \qquad (3)$$

$$d=NQ\frac{C_L}{C_m+C_L} \qquad (4)$$

$$f=\frac{NC_1E}{N^2C_1+C_m+C_L}\simeq\frac{NC_1E}{C_m+C_L} \text{ (at } d=0\text{)} \qquad (5)$$

$$f=\frac{NQ}{C_m+C_L} \text{ (at } d=0\text{)} \qquad (6)$$

where $N$=transducer ratio; open circuit voltage as a function of applied force
$C_1$=free or static capacity
$C_m$=compliance; ratio of deflection to applied force
$C_L$=compliant load
$d$=developed deflection
$f$=developed force.

The principal characteristics of the Clevite type PZT bimorph benders used are listed below

|  | PZT-5A | PZT-5B |
|---|---|---|
| $g_{31}(10^{-3}$ Vm./N.$)=$ | $-10.6$ | $-9.1$ |
| $d_{31}(10^{-12}$ m./v.$)=$ | $-140$ | $-161$ |
| $K$ $=$ | $1500$ | $2000$ |
| $Y(10^{-10}$ N./m.$^2)=$ | $7.6$ | $8$ |
| $\rho(10^3$ Kg/m.$^3)$ $=$ | $7.5$ | $7.5$ |
| $d_{31}=K\epsilon_0 g_{31}$ | | |

The symbols used in the above list are defined as follows:

$\epsilon_0$=permittivity of free space=$8.85\times10^{-12}$ farad/meter
$v=$ volts
$m$=meters
$N$=Newtons
$kg$=kilograms.

Figure 3:
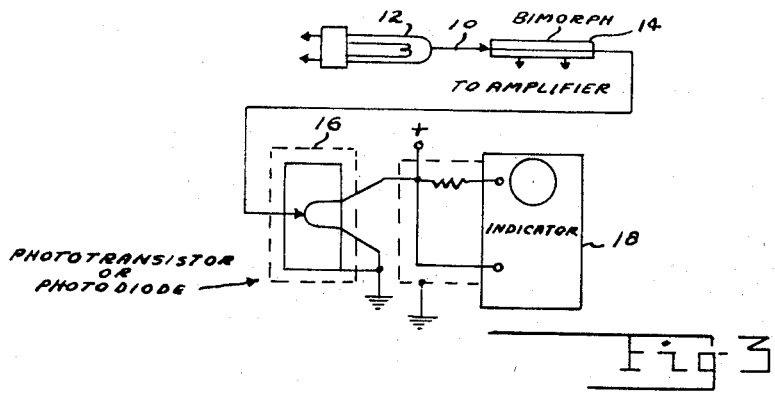
FIG. 3 is a schematic arrangement to measure displacement of a bimorph bender.
Figure 4:
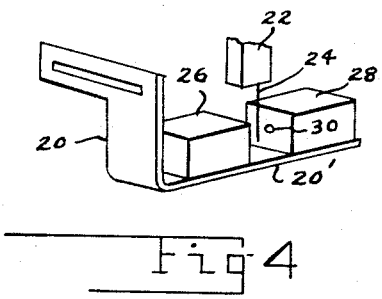
FIG. 4 is one arrangement for mounting a bimorph bender for deflection measurement.

One schematic arrangement for monitoring bimorph bender movements when excited with D-C, A-C, or square waves is shown in FIG. 3. Light rays 10 from a lamp 12 are directed onto an amplifier-driven bimorph bender 14 disposed intermediate the lamp and a phototransistor or photodiode 16 having as an output a current whose fluctuations represents the mechanical displacement of the bimorph. An indicator 18, which may, for example, be an oscilloscope, traces the deflection of the bimorph in terms of the phototransistor output current. Various representative examples of mounting bimorphs are shown in FIGS. 4, 6, 10, page 319, in "Instrument Transducers," by H. K. P. Neubert, Oxford University Press, 1963.

A test jig for measuring deflection of a cantilever-mounted bimorph bender is shown in FIG. 4. A mounting bracket 20 is adapted to be attached to the support (not shown) of a bimorph bender 22 carrying a downwardly extending stylus 24, such as one made of glass. A fixture 26 for a lamp of the type shown in FIG. 3 and a fixture 28 for a light-sensitive detector, having an input aperture 30 are mounted on an extending leg 20' of bracket 28. For the detector in fixture 28, an IN2175 Texas Instrument NPN diffused silicon photodiode was tried. The frequency response curve of this type photodiode is completely linear from 60 to 5000 c.p.s. and down to 3 db at 20,000 c.p.s.

A small piece of black tape attached to the tip of the glass stylus gives good results in modulating the light beam. One procedure for making the glass stylus is to heat a micropipette over a flame and then seal its tip after pulling with an automatic micropipette puller. Tip diameters on the order of $50\mu$ may be obtained.

Piezoelectric transducers are notorious for being virtually undamped and various methods have been attempted heretofore in order to improve the shape of the waveforms resulting from the photodiode output porduced by the mechanical deflection of the glass stylus. Damping materials such as rubber, foam plastic, and silicone gel are for the most part unsatisfactory in curbing ringing. The control of phase shift by feedback through a bimorph bender and its amplifier and a photodiode and its amplifier introduces problems which leave little enthusiasm for attempting other solutions through the use of feedback.

Figure 5:
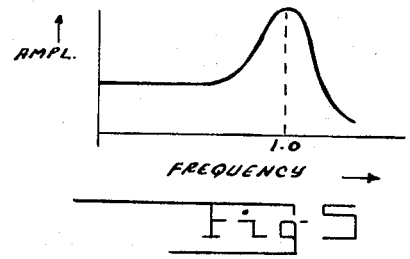
FIG. 5 is a normalized frequency response curve.

The response of a bimorph bender to a square wave approximates that of a low-pass filter in that it has a principal resonant peak, as shown in FIG. 5.

We see that, in Laplace transform notation, $$G(S)=\frac{E_{out}}{E_{in}}=\frac{1}{S^2+dS+1} \qquad (7)$$

where $S$ is the complex frequency and $d$ is a damping constant, resonance occurs at a normalized frequency of 1.0.

If an equivalent network is inserted between the generator and the amplifier which has a zero at the same frequency as the pole of the bimorph bender's response, then a critically damped response becomes possible.

In block diagram form, FIG. 6 shows a specific embodiment of the present invention in which a generator 32 feeds into a zero network 34. The output signal of the zero network is applied to an amplifier 36 that supplies the driving power for a transducer herein shown, for example, as a bimorph bender 38. For monitoring the response of the bimorph bender to the input wave supplied by generator 32, terminals 40 are provided.

From FIG. 6 we see that $$H(S)=E(S)F(S)G(S) \qquad (8)$$

Figure 7:
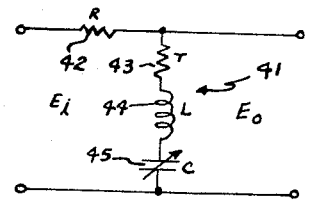
FIG. 7 shows a zero network.

Let $F(S)$ be produced by a zero network 41 of the type shown in FIG. 7 in which the reference numerals 42, 43, 44 and 45 denote the elements R, r, L and C, respectively.

$$F(S)=\frac{E_0}{E_i}=\frac{r+SL+\frac{1}{SC}}{R+r+SL+\frac{1}{SC}} \qquad (9)$$

$$=\frac{S^2LC+SrC+1}{S^2LC+(R+r)S+1}$$

If $L=1$ and $C=1$, so that the zero occurs at a normalized frequency of 1.0, then we have $$F(S)=\frac{S^2+rS+1}{S^2+(R+r)S+1} \quad (10)$$

$$H(S)=\frac{S^2+rS+1}{S^2+(R+r)S+1} \quad (11)$$

If $r$ is set equal to $d$, the damping constant, then, $$H(S)=\frac{1}{S^2+(R+r)S+1} \quad (12)$$

It will be appreciated that the term $$\frac{1}{S^2+(R+r)S+1}$$

when excited by $E(S)$, a square wave, will have the response of a low-pass filter where $(R+r)$ now determines the damping. Since $r$ is preselected according to the value of $d$, the variable parameter in FIG. 7 is now R. By adjusting L and C to the resonant frequency of the equivalent circuit of the bimorph bender and setting $r$ so as to cancel the ringing of the bimorph bender, R can then be adjusted until a critically damped response is produced. Amplitude responses of the bimorph bender for different damping constants are shown in FIG. 8.

A transducer system embodying the present invention is shown in detail by FIG. 9. The elements of the zero network 46 have reference numerals the same as corresponding elements illustrated in FIG. 7. The advantageous effect of the system of FIG. 9 is a critically damped response. With R set at maximum and $r$ at minimum (0 ohm), L and C are adjusted for minimum ringing. Then $r$ is adjusted for zero ringing on one side. Complete removal of ringing on both sides was not possible, at either the top or the bottom of the square wave. Any adjustment of R necessitated slight adjustment of L and C. By careful adjustment of $r$, R, L and C, the ringing could be reduced on one side and removed completely from the other side.

In the configuration of FIG. 9, the bimorph bender used was a Clevite type PZT-5, had a length of 0.44 inches, and operated a glass stylus 0.5 inch in length. It was found that a change in the input frequency on the order of 20 to 30 percent required corrective settings of resistor 42, resistor 43 and capacitor 45 in order to preserve the non-ringing characteristics of the output. The disturbing effect of a frequency change is due largely to the sin $x/x$ response of a square wave and the harmonics of the fundamental frequency coinciding with the resonant frequency of the crystal.

The curves shown in FIG. 10 illustrate the response of a barium titanate bimorph bender at different damped responses. As an illustrative case, typical approximate values for the circuit elements of the zero network are as follows:

Resistor 42 _____ ohms__ 25,000
Resistor 43 _____ do____ 500
Inductor 44 _____ henries__ 0.2
Capacitor 45 _____ μfd__ 0-0.1

The invention is particularly applicable to fields in which it is desired to record certain effects of mechanical vibration without suffering undue delay normally explained by the uninhibited oscillation of that class of crystals employed as transducers. It therefore will be appreciated that a transducer system using the invention as described could be made to operate continuously without the annoyance normally owing to the oscillatory habits of undamped ceramic elements. The invention therefore has particular application in those systems in which the form of an output wave must be faithful, as closely as possible, to the form of the input wave, and yet allow precise measurement of the displacement of the crystal brought under excitation.

Although only one embodiment of the invention has been illustrated and described, it will be apparent to those skilled in the art that various changes and modifications may be made therein without departing from the spirit of the invention or the scope of the appended claims.

We claim:

1. A system for stressing a piezoelectric element to provide a mechanical displacement output comprising: a piezoelectric element having electrical-energy receiving input terminals, amplifier means coupled to said input terminals for electrically driving said element to cause its mechanical displacement by energizing said input terminals, means for measuring the displacement of said element from a static position, equivalent network means connected to the input of said amplifier means and having the characteristics of a zero at the same frequency as the pole of the equivalent circuit of said element, said equivalent network means including adjustable means for damping the ringing of said piezoelectric element, and source means coupled to said equivalent network means for introducing an electrical signal proportional to the physical quantity to be measured.

2. The system of claim 1 in which the means for measuring the displacement of said piezoelectric element from a static position comprises a source of light rays directed onto a dependent member mounted on said element, photosensitive means disposed in the path of said light rays in alignment with the shadow of said dependent member, whereby said photosensitive means has as an output a current representative of the mechanical displacement of said element, and means receiving said current for converting said displacement into electrical signals.

3. The system of claim 1 in which said piezoelectric element comprises multiple piezoelectric plates operating in the compression-expansion mode.

4. The system of claim 1 in which said equivalent network means comprises capacitance means, inductance means, and first variable resistance means connected in series in the order named with one end of said resistance means connected to the input of said amplifier means, and second variable resistance means connected to said one end of said first resistance means and to that output terminal of said source means which is in phase opposition with respect to circuit ground.

References Cited

UNITED STATES PATENTS

| | | | |
|---|---|---|---|
| 2,459,019 | 1/1949 | Heedene | 333—72 |
| 2,551,809 | 5/1951 | Mortley | 333—72 |
| 2,975,354 | 3/1961 | Rosen | 333—72 |
| 3,109,153 | 10/1963 | Rodek | 333—72 |
| 3,130,893 | 6/1964 | Liben | 333—72 |
| 3,189,851 | 6/1965 | Fowler | 333—72 |
| 3,344,368 | 9/1967 | Fettweis | 333—72 |
| 3,365,590 | 1/1968 | Lobdell | 310—8.2 |
| 3,365,679 | 1/1968 | Matsumoto | 333—72 |
| 3,376,522 | 4/1968 | Traub | 310—8.2 |

J. D. MILLER, *Primary Examiner.*